Nov. 24, 1970     A. H. LINDQUIST     3,542,991

METHOD FOR MANUFACTURING LARGE TUBULAR SHAFTS

Filed Jan. 2, 1968     3 Sheets-Sheet 1

INVENTOR
ARNE HERMAN LINDQUIST
BY Hane and Baxley
ATTORNEYS

Nov. 24, 1970   A. H. LINDQUIST   3,542,991
METHOD FOR MANUFACTURING LARGE TUBULAR SHAFTS
Filed Jan. 2, 1968   3 Sheets-Sheet 2

INVENTOR
ARNE HERMAN LINDQUIST
BY Hame and Bayley
ATTORNEYS

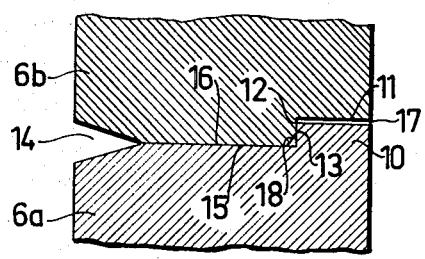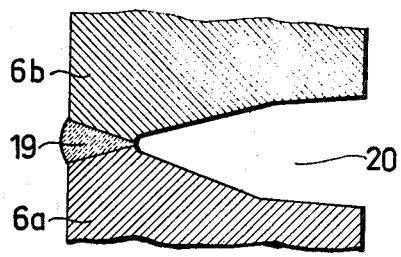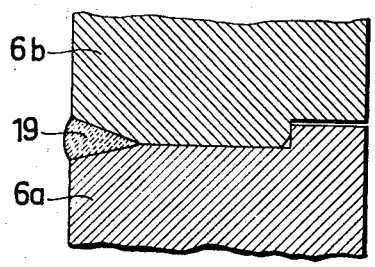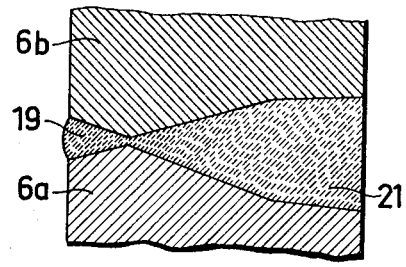

United States Patent Office 3,542,991
Patented Nov. 24, 1970

3,542,991
METHOD FOR MANUFACTURING LARGE TUBULAR SHAFTS
Arne Herman Lindquist, Trollhattan, Sweden, assignor to Nydqvist & Holm Aktiebolag, Trollhattan, Sweden, a corporation of Sweden
Filed Jan. 2, 1968, Ser. No. 695,048
Claims priority, application Sweden, Jan. 2, 1967, 63/67
Int. Cl. B23k *31/06*
U.S. Cl. 219—61
1 Claim

ABSTRACT OF THE DISCLOSURE

A method for manufacturing large tubular shafts by welding together a number of tubular sections. End surfaces of successive tubular secitons are provided with cooperating alignment means which include radial abutment surfaces and axial abutment surfaces to retain the successive tubular sections in aligned relationship relative one another. The tubular sections are joined by means of a partial weld. While the tubular sections are thus held together by the partial weld, material is removed from both sides of the radial and axial abutment surfaces to form a groove suitable for receiving weld material. Thereafter the groove is filled with weld material to complete the final weld.

CROSS REFERENCE

This application is based upon Swedish patent application 63/67 filed Jan. 2, 1967. Priority thereon is hereby claimed.

BACKGROUND

The present invention is concerned with large shafts, particularly shafts for water turbines, pump turbines and pumps. Such shafts having an output exceeding 20,000 HP are both long and heavy, reaching weights of 100 tons or more. Consequently there are but few, if any, steel works capable of forging shafts of those dimensions. The weight of these shafts can be reduced by approximately half by producing the shafts in tubular form. Further, the quality of the shaft material can be more easily controlled; thereby safeguarding against expensive rejections due to faults located at a late stage of the manufacturing process. Moreover, a further advantage is gained in that certain operating means, e.g. turibne blade adjusting means can be mounted within the shaft.

Because tubes of sufficient length in the dimensions required are not available, the shafts must be constructed from tubular sections which are welded together. In any event, the flanges secured to the ends of the shafts must be welded to the main body of the shaft. Tubular shafts have previously been manufactured in this manner and welded by means of, e.g. the electroslag welding method. A disadvantage of this method is that subsequent to being welded the shafts must be normalized by heat treatment, to obtain good material structure in the weld joint. The shafts may become distorted during this heating process. Long shafts are difficult to make straight and difficult to work internally. In the majority of cases it is, however, necessary to work the interior of the shaft when applying this method of manufacture.

The present invention relates to an improved method of manufacturing tubular shafts by welding together a number of tubular sections, which eliminates the aforementioned disadvantages and which provides for a straight and internally circular shaft subsequent to welding the sections together, thus rendering any subsequent straightening operations unnecessary.

SUMMARY

The method according to the invention is mainly characterized in that the facing end surfaces of the various tubular sections are provided with cooperating alignment means, which maintain said surfaces in the correct position relative to one another, and in that subsequent to assembling the shaft with the end faces of the sections abutting each other and the alignment means in cooperating positions the end faces are joined together by a partial weld and in that while the tubular sections are held joined together by the partial weld the material of the tubular sections situated on either side of the abutting surfaces is machined to form a suitable groove for receiving welding material, whereafter a final weld is made filling the groove with welding material.

The alignment means may comprise an annular projection on one opposing end surface and a corresponding recess on the other end surface, so arranged that an annular peripheral surface on the projection abuts a corresponding surface in the recess, for the purpose of keeping the two parts in coaxially aligned relationship.

The first partial weld joint is suitably made manually internally in the shaft and need only be sufficient to hold the tubular sections in their mutual positions, determined by the alignment means, while the above mentioned groove is made, in which the alignment means are removed, and while the final weld is being made. This weld is made externally and can be effected by means of an automatic welder, subsequent to placing the assembled shaft on pulley brackets or some other form of support. By using a so-called automatic power-arc welder, a good quality weld deposit can be obtained without it being necessary to normalize the material subsequent to making the weld.

DESCRIPTION OF DRAWINGS

An embodiment of the invention will now be described with reference to the accompanying drawings, in which FIGS. 3–6 illustrate in enlarged scale the appearance of the joint during different manufacturing stages.

PREFERRED EMBODIMENT

Figure 1:
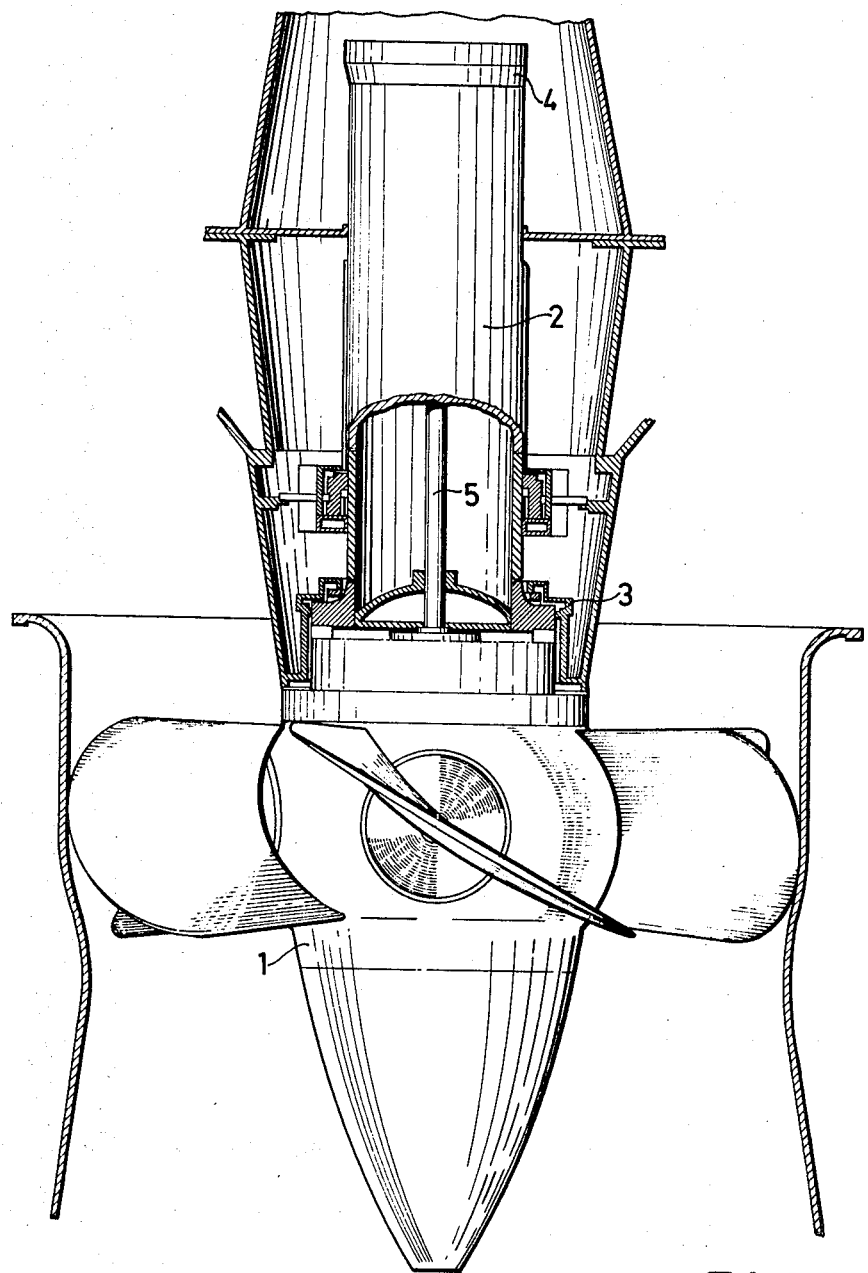
FIG. 1 shows a turbine provided with a tubular shaft of the type with which the invention is concerned.
Figure 2:
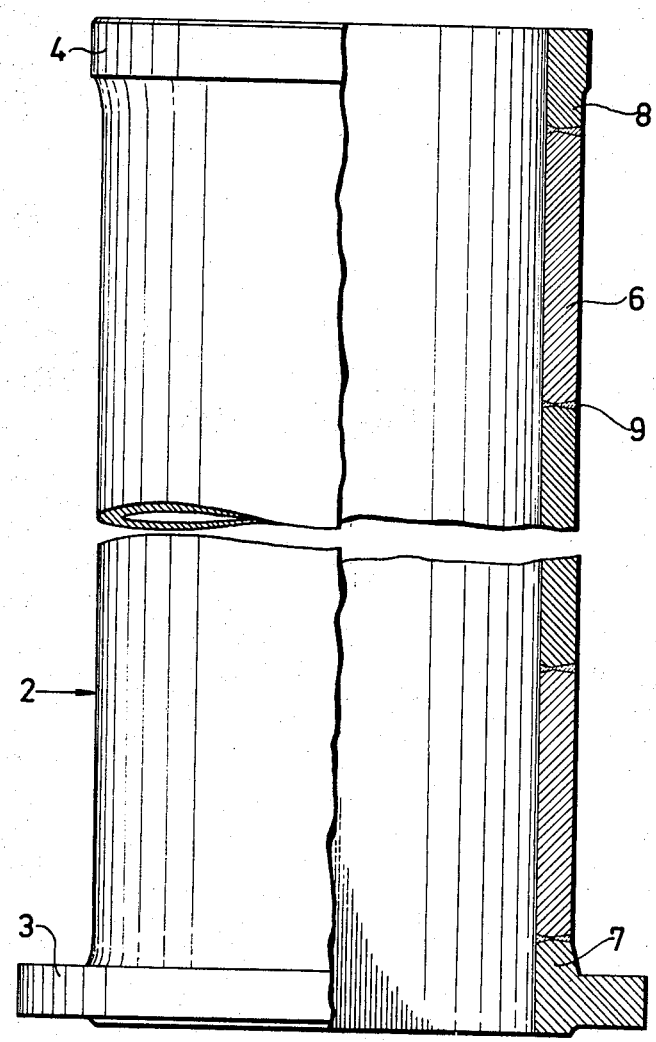
FIG. 2 is a side view, partly in section, of a tubular shaft.

Shown diagrammatically in FIG. 1 is a water turbine of conventional design presenting a turbine wheel 1 supported by a tubular shaft 2 provided with a lower flange 3 and an upper flange 4. Extending through the tubular shaft 2 is a member 5 for adjusting the setting of the turbine blades. In large water turbines of this type, the shaft 2 obtains very large dimensions and it is to advantage to make the same tubular. According to the invention a shaft of this nature is produced by welding together several tubular sections 6 (FIG. 2) of the required diameter for the main body of the shaft and shorter tubular sections or rings 7, 8 provided with end flanges 3, 4. The tubular sections are joined together by welding, as indicated by the weld joints 9 in FIG. 2.

As a first stage in the manufacture of a tubular shaft according to the invention the opposing end surfaces of the tubular sections are provided with alignment means, which assure that the tubular sections are in true coaxial alignment when the tubular sections are assembled. As can be seen from FIG. 3, one tubular section 6a can be turned down so as to present an annular projection or ridge 10, suitably located adjacent to the outer peripheral surface of the tubular section. The other tubular section 6b is provided with a corresponding groove 11, so shaped that the cylindrical side surface 12 has the same diameter as the opposing cylindrical side surface 13 of the ridge 10. The inner peripheral surface of the tubular sections are chamfered so that when the sections 6a and 6b are brought together a V-shaped groove 14 is formed. For the rest the tubular sections present planar, axial abutment surfaces 15, 16 which comprise the major portion of the end surfaces, and to assure good engagement between said surfaces it may be expedient to give the projection 10 an axial height which is somewhat less than the axial depth of the groove 11 so that a small gap 17 is formed therebetween, and also to chamfer the outwardly directed edge 18 on the tubular section 6b, as shown in FIG. 3.

Subsequent to preparing all the tubular sections in this manner, including the flange rings 7, 8, and after the tubular sections have been assembled, the tubular sections are welded together preliminarily by filling the internal grooves 14 with weld metal 19 (FIG. 4). The internal weld can be made manually and need only be sufficient to ensure that the tubular sections are held together during subsequent working operations. The alignment means at the end surfaces of the tubular sections hold said sections in the correct position while this weld is being made.

The tubular sections are then machined (FIG. 5) externally down to the inner end of the weld 19, so that a substantially V-shaped groove 20 is formed; whereafter the final weld is made, the whole groove 20 being filled with weld metal 21 (FIG. 6). This step in the manufacture of the shaft can be effected with said shaft supported on pulley brackets or other supporting means, so that the work can be conveniently performed by means of an automatic welder. By using, for instance, a power-arc automatic welder a good quality weld deposit can be obtained without subsequent normalization of the heated material.

The preliminary weld 19 holds the tube sections in the position determined by the alignment means, while the shaft is machined and the joint 20 is welded, so that a perfectly straight shaft is obtained and no subsequent internal working of the shaft is required.

It will be apparent to those skilled in the manufacture of large tubular shafts that wide deviations may be made from the preferred embodiment here set forth without departing from the main theme of invention set forth in the following claim.

What is claimed is:
1. A method for manufacturing large-diameter thick-walled tubular shafts by welding together a plurality of tubular sections end to end and comprising the steps of:
providing facing ends of adjacent tubular sections with radial alignment means which include an annular ridge formed adjacent the outer peripheral surface on one of the ends and having an inward cylindrical surface, the other end having an annular channel corresponding to the ridge and having a height greater than the ridge and an outward cylindrical surface the same diameter as the inward cylindrical surface of the ridge and cooperating therewith for radial alignment of the facing end surfaces;
providing the facing ends with axial alignment means which include abutting coplanar surfaces one on each of the ends and each comprising a major portion of the thickness of its end;
providing chamfers on both ends inward of the abutting coplanar surfaces and extending to their inner peripheries to define an inward-opening welding groove;
joining the adjacent tubular sections by means of a partial weld in the inward-opening welding groove and covering only a minor portion of the thickness of the tube wall;
while the adjacent tubular sections are thus held together by partial weld, removing from the outside material of the ends including both sides of the inward and outward cylindrical surfaces to form an outward-opening welding groove which extends into the partial weld;
filling the outward-opening welding groove with materials to provide the final weld.

References Cited
UNITED STATES PATENTS

| | | | |
|---|---|---|---|
| 1,810,902 | 6/1931 | Burnish | 219—105 |
| 1,812,123 | 6/1931 | Stresau | 219—137 |
| 2,812,419 | 11/1957 | Chyle | 219—137 X |
| 3,223,816 | 12/1965 | Marsden | 219—137 X |

ANTHONY BARTIS, Primary Examiner

J. G. SMITH, Assistant Examiner

U.S. Cl. X.R.
219—137